(No Model.)
L. J. GILMAN.
PRUNING IMPLEMENT.
No. 474,085. Patented May 3, 1892.
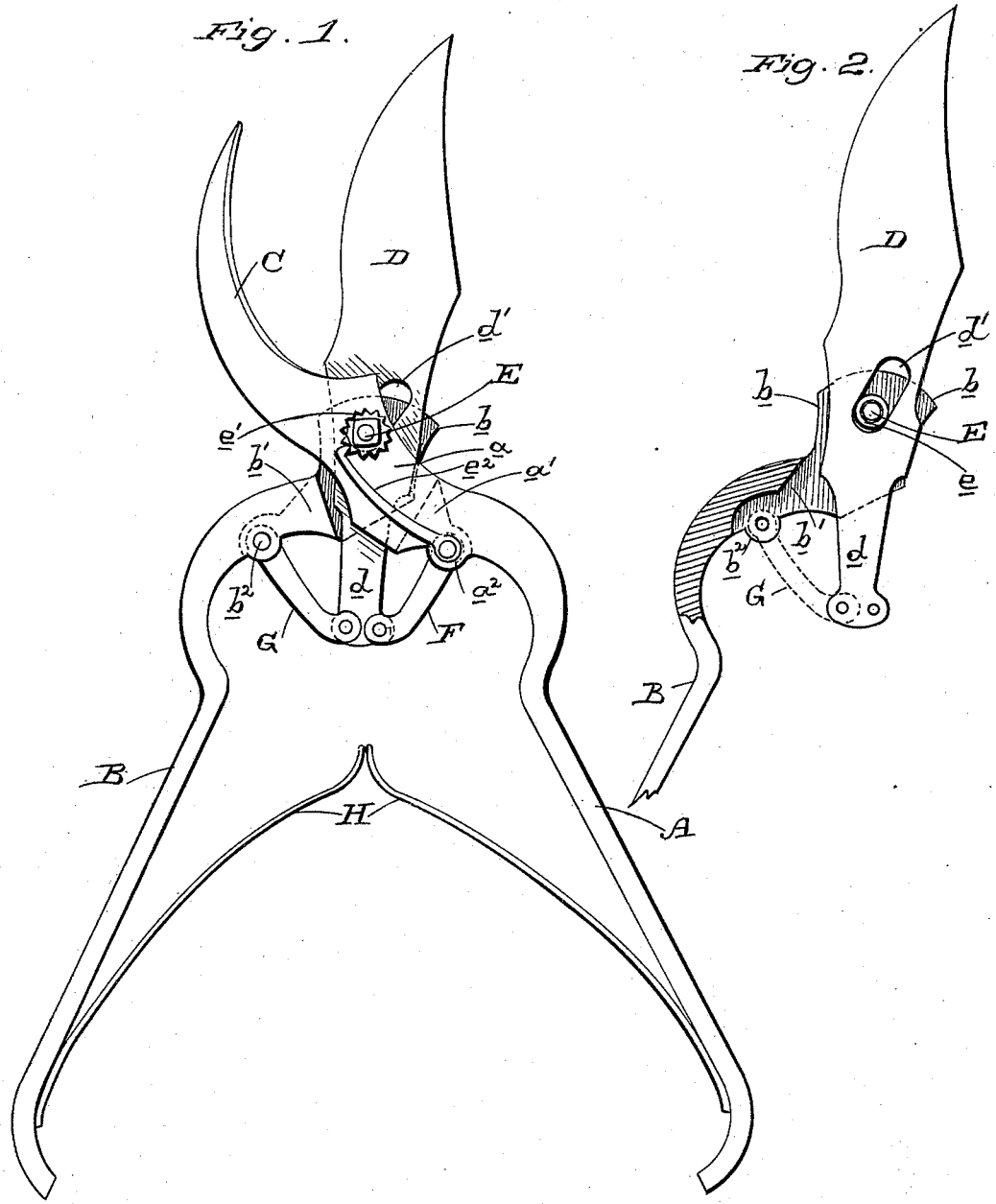
Witnesses:
J. H. House
J. A. Bayless
Inventor,
Lewell J. Gilman
By Dewey & Co.
attys

UNITED STATES PATENT OFFICE.

LEWELL JESSE GILMAN, OF SANTA ROSA, CALIFORNIA, ASSIGNOR OF ONE-HALF TO ALEXANDER WESTRUP, OF SAME PLACE.

PRUNING IMPLEMENT.

SPECIFICATION forming part of Letters Patent No. 474,085, dated May 3, 1892.

Application filed November 27, 1891. Serial No. 413,326. (No model.)

*To all whom it may concern:*

Be it known that I, LEWELL JESSE GILMAN, a citizen of the United States, residing at Santa Rosa, Sonoma county, State of California, have invented an Improvement in Pruning-Shears; and I hereby declare the following to be a full, clear, and exact description of the same.

My invention relates to that class of pruning-shears in which the blade is so arrranged as to have what is known as a "draw cut."

My invention consists in the novel connection of the blade and handles hereinafter fully described, and specifically pointed out in the claims.

The objects of my invention are to simplify the construction of the shears and to increase their power, durability, and general effectiveness.

Referring to the accompanying drawings for a more complete explanation of my invention, Figure 1 is an elevation of my shears. Fig. 2 is a view showing the upper end of handle B in horizontal section to show its halved-out and slotted head and the connection of blade D therewith, it being understood that the head of handle A is similarly halved out and slotted, as is shown by the dotted lines in Fig. 1.

A is one handle having the usual finger C joining its head portion $a$, which said head portion is halved out and slotted backwardly, as shown at $a'$. B is the other handle, the head $b$ of which is halved out from the opposite side and slotted backwardly, as shown at $b'$. The halved-out heads of the two handles enable them to be pivoted together and to receive between them the blade D. This blade has a downwardly-extending shank $d$, and it is provided with an elongated slot $d'$, through which the pivot-post E freely passes, said post having upon it an anti-friction roller or ring $e$. The shank $d$ of the blade passes down between the handles, the slots $a'$ and $b'$ of which play freely over it as the handles close and open. In small ears $a^2$ on handle A is pivoted one end of a link F, the other end of which is pivoted to the end of the shank $d$ of blade D. A similar link G is pivoted to ears $b^2$ in handle B and also to the end of shank $d$. The pivot-post has the usual ratchet-nut $e'$, which is controlled by a pawl $e^2$, the other end of which is carried on the pivot connecting the link F with handle A.

The points of connections of links F and G with the handles are above their connections with the end of shank $d$.

H is a spring for opening the handles.

The slot $d'$ in shank $d$, though it may be made straight, is preferably made at an angle, as shown.

The operation of the shears is as follows: As the handles close together, the links F and G force the blade down at the same time that the link G, forcing the shank over, closes the blade up to and over the the finger C. As the handles separate, the links return the blade, pushing it up, and the link F at the same time moves it away from the finger. In the closing operation a perfect draw cut is obtained.

A feature to be particularly noticed in my shears is that, unlike other shears in which a sliding blade is used, the power increases as the blade closes. This is due to the increasing length of the blade-shank below the pivot-post as it is drawn down. The action of link G on the shank is the cause of the blade closing on the work, and as the shank is drawn down it gives an increasing leverage, which results in increased power at the close of the stroke.

Another feature to be noticed is that by having the shank $d$ as the lever of the blade the power of the shears may be regulated by the length of this shank or the point of connection of the links therewith. This gives an easy opportunity of making shears of any power desired. The inclination of the slot $d'$ in the blade enables the links to push the blade up far enough to present a wide opening for the reception of big work. The location of the blade between the handles is of advantage, in that it guides and keeps it braced and steady in its movements.

Having thus described my invention, what I claim as new, and desire to secure by Letters Patent, is—

1. In pruning-shears having pivoted handles, one of which carries a finger C, and a blade slotted upon the pivot-post of the handles and having a shank passing through the same and with its lower end connected with said handles, substantially as herein described.

2. In pruning-shears, the combination of opposing pivoted handles, a blade slotted on the pivot-post of the handles and having a shank extending downwardly between said handles, and links pivoted at their outer ends to said handles and at their inner ends to the blade-shank, substantially as herein described.

3. In pruning-shears, the combination of the opposing handles having the slotted heads, one of said handles having a finger, the slotted blade lying between said handle-heads and having a downwardly-extending shank passing between the slotted heads of the handles, the pivot-post of the handles passing through the slotted blade, and the links pivoted to the handles and to the blade-shank, substantially as herein described.

4. In pruning-shears, the combination of opposing pivoted handles, the blade having an inclined elongated slot fitting over the pivot-post of the handles and a shank extending downwardly between said handles, and the links pivoted at their outer ends to the handles and at their inner ends to the blade-shank, substantially as herein described.

In witness whereof I have hereunto set my hand.

LEWELL JESSE GILMAN.

Witnesses:
J. W. RAGSDALE,
PAUL T. HAHMAN.